US008724182B2

(12) United States Patent
Labois et al.

(10) Patent No.: US 8,724,182 B2
(45) Date of Patent: May 13, 2014

(54) METHOD FOR DETECTING BLANK PAGES, AND CORRESPONDING MULTIFUNCTIONAL MACHINE

(75) Inventors: Olivier Labois, Rueil Malmaison (FR); Pierre Sabatier, Rueil Malmaison (FR); Jérôme Berger, Rueil Malmaison (FR)

(73) Assignee: Sagemcom Documents SAS, Rueil Malmaison (FR)

( * ) Notice: Subject to any disclaimer, the term of this patent is extended or adjusted under 35 U.S.C. 154(b) by 84 days.

(21) Appl. No.: 13/395,101

(22) PCT Filed: Sep. 10, 2010

(86) PCT No.: PCT/EP2010/063283
§ 371 (c)(1),
(2), (4) Date: Mar. 8, 2012

(87) PCT Pub. No.: WO2011/029894
PCT Pub. Date: Mar. 17, 2011

(65) Prior Publication Data
US 2012/0170082 A1 Jul. 5, 2012

(30) Foreign Application Priority Data
Sep. 10, 2009 (FR) ...................................... 09 56217

(51) Int. Cl.
*H04N 1/04* (2006.01)
(52) U.S. Cl.
USPC .......................................... 358/474; 358/496
(58) Field of Classification Search
USPC .................. 358/474, 475, 498, 486, 501, 505
See application file for complete search history.

(56) References Cited

U.S. PATENT DOCUMENTS

| | | | | |
|---|---|---|---|---|
| 7,545,529 | B2 * | 6/2009 | Borrey et al. | 358/1.15 |
| 8,085,451 | B2 * | 12/2011 | Matsutani | 358/538 |
| 8,115,969 | B2 * | 2/2012 | Borrey et al. | 358/448 |
| 8,125,693 | B2 * | 2/2012 | Arai | 358/462 |
| 8,203,763 | B2 * | 6/2012 | Megawa et al. | 358/448 |
| 8,223,411 | B2 * | 7/2012 | Akiyama et al. | 358/522 |
| 8,229,315 | B2 * | 7/2012 | Sakai | 399/85 |
| 8,233,181 | B2 * | 7/2012 | Abraitis et al. | 358/1.15 |
| 8,260,043 | B2 * | 9/2012 | Kubota | 382/165 |
| 8,270,041 | B2 * | 9/2012 | Fujiwara | 358/448 |
| 8,319,988 | B2 * | 11/2012 | Ferlitsch | 358/1.15 |
| 8,373,895 | B2 * | 2/2013 | Fan et al. | 358/1.9 |
| 8,456,652 | B2 * | 6/2013 | Unno | 358/1.12 |

(Continued)

FOREIGN PATENT DOCUMENTS

JP 2002044367 2/2002
WO WO 2006/104627 10/2006

*Primary Examiner* — Negussie Worku
(74) *Attorney, Agent, or Firm* — Blakely Sokoloff Taylor & Zafman (57) ABSTRACT

The invention relates to a method for detecting blank pages among sheets of a document scanned on a multifunctional machine comprising a scanner, wherein said scanner: scans (S0) two pages of at least one sheet of a document to be scanned; carries out a basic detection (S6) of a blank page on each scanned sheet; selects (S7) each sheet not comprising at least one page detected to be blank during the detection (S6); compares (S9) the two pages of said selected sheet; and classifies (S9) a page as blank when it is similar to the other page of said sheet. The invention also relates to a multifunctional machine, the machine comprising a scanner for implementing a method according to the invention.

10 Claims, 3 Drawing Sheets

(56) References Cited

U.S. PATENT DOCUMENTS

| | | | |
|---|---|---|---|
| 8,488,155 B2 * | 7/2013 | Maruyama et al. | 358/1.15 |
| 8,508,811 B2 * | 8/2013 | Safonov et al. | 358/474 |
| 8,559,072 B2 * | 10/2013 | Takeuchi | 358/475 |
| 8,587,842 B2 * | 11/2013 | Chen et al. | 358/474 |
| 8,593,673 B2 * | 11/2013 | Couchman et al. | 358/1.15 |
| 8,614,817 B2 * | 12/2013 | Miyata | 358/1.15 |
| 2012/0154853 A1 * | 6/2012 | Otake | 358/1.15 |

\* cited by examiner

METHOD FOR DETECTING BLANK PAGES, AND CORRESPONDING MULTIFUNCTIONAL MACHINE

This is a non-provisional application claiming the benefit of International Application Number PCT/EP2010/063283 filed Sep. 10, 2010.

GENERAL TECHNICAL FIELD

The present invention relates to a method for detecting blank pages in the sheets of a document scanned on a multifunction machine that includes a scanner.

The invention also relates to a multifunction machine, the machine including a scanner implementing a method according to the invention.

STATE OF THE ART

During the scan of a document, comprising a plurality of sheets, on a multifunction machine that includes a scanner, conventionally a two-sided scanner, detection of blank pages is sought to avoid storing them in memory and processing them.

At present, most proposed solutions are constructed on the basis of a simple technique based on comparison of the total white level of each page with respect to a threshold.

Such a solution is known from WO2006/104627 for example.

The solution according to WO2006/104627 also allows detection of information present on the other side of a page and viewed by transparency during the scan.

This solution, however, exhibits the disadvantage of requiring prior complex registration of the front and the back of the scanned sheet, because due to the mechanics of the scanner, the scanned front and back pages are offset with respect to one another.

Also known, from JP 2002 044367, is a method for detecting blank pages in the sheets of a document to be scanned on a multifunction machine.

JP 2002 044367 discloses a method wherein the scanner compares the gray tone intensity levels and decides that the sheet includes a blank sheet when the two pages are very different in intensity, or that the sheet includes two non-blank pages when the two pages are similar, that is when a datum characteristic of similarity (here the gray tone intensity level) of the two pages exceeds a similarity criterion.

It is therefore not possible to detect, using JP 2002 044367, a blank page on a sheet having two similar pages, and it is therefore not possible to detect information present on the other side of a page viewed by transparency.

DISCLOSURE OF THE INVENTION

The invention proposes to correct these disadvantages.

To this end, a method according to claim 1 is proposed according to the invention.

The invention is advantageously completed by the features of claims 2 through 9, taken alone or in any one of their technically possible combinations.

The invention also relates to a multifunction machine including a scanner for implementing a method according to the invention.

The invention has numerous advantages.

First of all, it allows effective detection of blank pages in a document without requiring registration of the front and back pages of the scanned sheets. This is allowed by the fact that the solution according to the invention is impervious to offsets between the front and the back of sheets.

It allows automatic detection of whether or not the information apparently carried by a scanned sheet corresponds to real information.

Some examples of non-real information are:
ink deposited on one front (for example a rubber stamp on the front page) and showing on the other front (the back page) by porosity of the material of the sheet that is viewed by transparency on the scanner,
the dark monochrome color of a sheet, or
creasing of the sheet which is detected by the scanner because it creates a shadow on the sheet upon scanning.

However, the invention makes it possible to classify as an information-bearing page a page whereon there is only handwriting, even if it has poor contrast with respect to the background.

The invention allows implementation on a multifunction machine having limited memory and calculation means, without intervention by the user, in an automated fashion.

The invention thus allows very robust and rapid detection of information, because it is mostly oriented toward the detection of pages containing real information. This is due particularly to the fact that the pages detected as blank are not transferred to memory for storage and processing. Thus, to optimize the decision speed, several detection steps have been set up. They are crossed only in the most difficult cases, the easiest cases being detected during the early detection steps.

PRESENTATION OF THE FIGURES

Other features, objects and advantages of the invention will appear from the description that follows, which is purely illustrative and non-limiting, and which must be read with reference to the appended drawings in which.

In all the figures, similar elements bear identical numerical labels.

DETAILED DESCRIPTION

Figure 1:
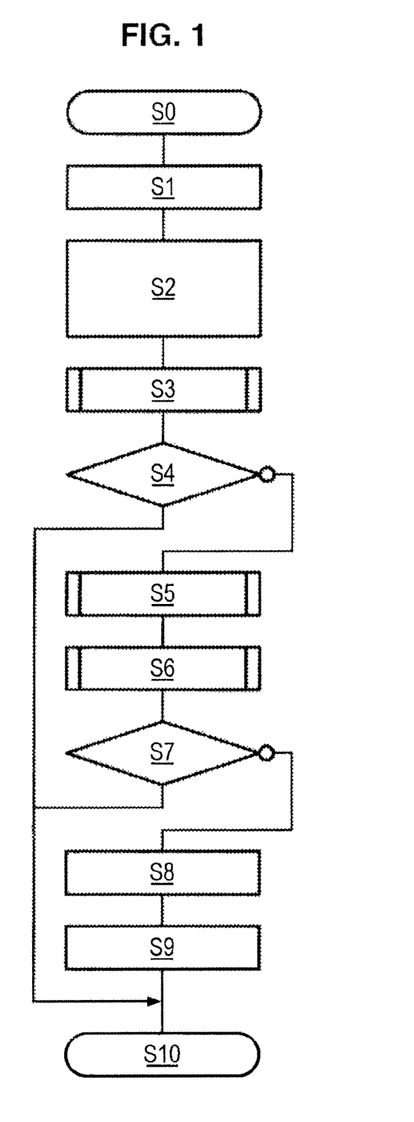
FIG. 1 is a simplified block diagram of the principal steps in a method according to the invention.
Figure 2:
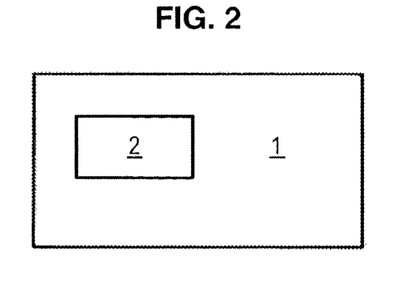
FIG. 2 is a highly simplified representation of a multifunction machine according to the invention.

With reference to FIGS. 1 and 2, the principal steps of a method according to the invention are shown, implemented by a multifunction machine 1 including a scanner 2.

The multifunction machine 1 can include fax, photocopy, network server, printing, and telephony functions, and/or any other office automation function for example.

The scanner 2 conventionally includes all processing and memory means for scanning the sheets of a document to be scanned on the machine 1. The scanner advantageously allows two-sided scanning of each sheet of the document to be scanned.

As can be distinguished in FIG. 1, a possible method of detection of blank pages in the sheets of the document scanned on the multifunction machine 1, including the scanner 2, comprises the principal steps wherein the scanner 2:

scans, during a step S0, two pages of at least one sheet of the document to be scanned;

carries out a simple blank page detection step, during a step designated S6 in FIG. 1, on each scanned sheet;

selects, during a step S7, each sheet not including at least one page detected as blank during the aforementioned detection;

compares, during a step S9, the two pages of said selected sheet, and classifies, during step S9, a page as blank when it is similar to the other page of said sheet.

As will be seen in more detail later in the present description, the scanner 2 considers that a page is "similar" to another page when a datum characteristic of similarity exceeds a similarity criterion.

More precisely, the step S0 conventionally allows the scanner 2 to scan two pages of a sheet of the document to be scanned.

During a step S1, the scanner 2 analyzes the scanned pages and conventionally carries out their transcription into a table representing the value of each pixel of every page. The pages are thus transformed into a set of pixels belong to the real number space.

During a step S2, the scanner 2 carries out a step consisting of suppressing the edges and/or adjusting the size and/or transposing into gray levels of the scanned pages.

Given here is an example of edge suppression technique.

In a two-sided scanner, the scanned pages typically include a more or less wide edge. It is for this reason that it is advantageous to suppress the edges of pages so as not to impede the subsequent interpretation of the pages. The technique employed is intentionally very simple and consists of removing for example 5% of the page at the edges. Values other than 5%, or other more complex suppression techniques can of course be provided for.

Given here is an example of a size readjustment technique for the scanned pages.

For the sake of increasing the speed of implementation of the method by the scanner 2, the size of each scanned page is reduced. It is thus possible to reduce the resolution of the page by retaining only one pixel in every two, for each reduction pass. This makes it possible to have greater speed of implementation.

Reduction is performed until the area of the pages is less than 150,000 pixels. Indeed, such a size makes it possible to have a good implementation speed in the subsequent steps, and good performance in detection of blank pages. Other techniques are also possible, for example by taking for each pixel the average of the neighboring pixels.

Given here is an example of transposition into gray tone levels of the scanned pages.

It is understood that detection of a blank page does not require color to be taken into account. It is thus advantageous to assign a gray level value to the pixels of the scanned pages. This allows simplification of the later processing.

In order to optimize complexity and the memory requirement of the scanner for implementing the method, the steps of edge suppression and/or size readjustment and/or transposition into gray levels of the scanned pages can be carried out simultaneously. For this purpose, it is possible for example to extract one by one the desired pixels, transform them into gray levels, then store them one by one in the scanned page to be processed.

During a step S3, the scanner 2 carries out a first simple blank page or information-bearing page detection on each scanned sheet, in gray levels. A simple detection is a technique based on a comparison with at least one threshold.

Thus, the information contained in each of the pages is inspected and a decision is made regarding its state.

Either the page is indisputably blank (that is, it is not information-bearing) or non-blank (that is, it is information-bearing), or the scanner cannot make a decision (this is the case particularly with pages containing little writing, or having received information from another page by transparency, or the writing whereon has little contrast with respect to the background).

The aim of the first simple detection during step S3 is to determine whether or not there is information written on the sheet, either printed or handwritten, regardless of the color of the sheet and of the information.

Given here is an example of a technique for the first detection according to S3

It is for example possible to measure, first of all, the variance of the pixels over all of the pages converted to gray levels, then to compare the measurements made to two thresholds: one threshold t1 for detection of blank pages and a threshold t2 for detection of information-bearing pages. The two thresholds t1 and t2 can for example be determined empirically. The upper threshold t2 can for example be set to the value 125. In fact, this value corresponds to the lowest variance value of pages bearing information on a large portion of the sheet. The lower threshold t1 can be set to the value 2, which corresponds to pages that are almost perfectly blank: pages having very little writing and weak contrast with the background have a very low variance. The threshold t1 is only rarely useful. Pages the variance whereof is greater than 125 are classified as information-bearing, and the pages the variance whereof is less than two are classified as blank.

In step S4 it is then determined whether it is possible to carry out detection on each page of the sheet (in other words, whether the sheet includes two blank pages, two information-bearing pages or one information-bearing page and one blank page). If that is the case, then the scanner moves to a step S10, which is the page classification step: the information-bearing pages are stored and processed and the blank pages are neither processed nor stored.

However, if each page has not been detected as blank or information-bearing during the first detection of step S3, the scanner continues to a step S5.

During step S5, subsequent to step S4, the scanner 2 performs a binarisation of the pages of each sheet selected during step S4 (that is a binarisation of the pixels of the pages of each sheet), binarisation thus consisting of giving an active value to each pixel the gray level whereof is greater than a threshold τ, and an inactive value to a pixel the gray level whereof is below the threshold τ.

As explained later, τ is defined dynamically depending on the neighborhood of the pixel.

In the method, a bit having an active value is conventionally chosen to represent an information-bearing pixel and a bit having an inactive value represents a "white" background pixel.

Given here is an example of a possible binarisation technique.

The binarisation in step S5 consists of obtaining a binary image (made up of 0 s (inactive value) and preferably of 1 s (active value) or sometimes of 0 s (inactive value) and 255 (active value) as the case may be) from a gray-scale page resulting from step S4. Binarisation makes it possible to index all the information present on the sheet by having the information on one side and the background on the other. binarisation also allows an increase in the speed of implementation of the subsequent steps in the method and a considerable reduction in the memory requirements of the scanner. Indeed, the page, once converted to binary, needs only one bit per pixel.

One advantageous binarisation technique can be an adaptation of that proposed by Sauvola in his paper entitled "Adaptive document image binarisation" published in 1998. This technique is based on an adaptive selection of the threshold τ using the formula:

$$\tau(x, y) = \mu(x, y) \cdot \left[1 + k \cdot \left(\frac{\sigma(x, y)}{R} - 1\right)\right]$$

where μ is the local estimated mean in the neighborhood local to the pixel with coordinates (x,y), a neighborhood of size n×n (in our example, n=3);

σ is the estimated standard local deviation in a neighborhood local to the pixel with coordinates (x,y) of size n×n;

k is the weighting factor used to specify which proportion of the contours of an image is incorporated into the image (the conventional value for the weighting factor k is 0.5);

R designates the dynamic range of the standard deviation s (R=128 for pages coded in 256 gray levels).

Advantageously, the sensitivity of the detection is increased by modifying the value of the weighting factor k. The value k=0.1 is preferred, because for a lower value of k, the contours of the background shades are detected as writing: the scanner is then too sensitive. For higher values, the scanner may not be sensitive enough.

During a step S6, the scanner 2 carries out a second simple blank page or information-bearing page detection on each binarised page.

Given here is an example of a detection technique according to step S6.

The scanner 2 compares the quantity of information on each binarised page with respect to a threshold s.

The threshold s is determined empirically and corresponds to the quantity of information derived for example from a line of pixels with a length equal to half the width of the sheet to be scanned.

It has been observed that the threshold s thus determined is below the energy generated by writing a word on a perfectly white sheet. The threshold s thus determined therefore makes it possible to exclude blank pages with a slight noise, for example having only a few disparate active pixels.

If the quantity of information is below the threshold s, the page is detected as blank.

It is determined during a step S7 whether it is possible to carry out detection of a blank page over at least one page of the sheet. If that is the case, then the scanner moves to step S10, which is a page classification step: the information-bearing pages are stored and processed and the blank pages are neither processed nor stored.

However, if it isn't possible to detect a blank page during the second detection step S6, the scanner 2 selects said sheet and moves to a step S8.

In conclusion, the second detection according to step S6 makes it possible to exclude certain cases, such as sheets that are not white in color, but rather monochrome in another color, sheets having only creases and/or very light bleed-through of ink by porosity or transparency which are eliminated by the binarisation.

During step S8, the scanner 2 assigns, in the sheets derived from step S7, the front page R of the sheet to the page having the greater probability of being information-bearing. The scanner 2 assigns the back page V to the other page of the sheet.

Given here is an example of the technique of assigning the front page R and the back page V.

Step S8 consisting of assigning the front page and back page can consist of selecting as the front page the side that has the greater energy (sum of the values of all the pixels).

During step S9, the scanner compares the two pages of said selected sheet, to classify them: one page is classified as blank when it is similar to the other page of said sheet (it is then considered that the information is not real information but rather is viewed by transparency or porosity).

Given here are examples of page comparison technique.

Several techniques are in fact possible.

To carry out comparison of the pages, the scanner uses for example an indexing of each page which consists of describing each page by its content, using vectors consisting of low-level parameters relating to color, shape and texture for example.

Thus, there corresponds to each page at least one characteristic vector constituting at least one index of the page.

The comparison is not carried out on the pages directly, by rather the comparison is performed on characteristic vectors, by searching for the number of similarities for example.

The number of similarities thus corresponds to the datum characteristic of similarity. It is then considered that the pages are similar when the characteristic datum (the number of similarities between vectors) is greater than a similarity criterion.

Advantageously, the scanner thus performs an indexing step such as that mentioned above, a step consisting of structuring the page and a comparison of information derived from the two preceding steps, by searching for similarities between the vectors for example.

Thus advantageously, to carry out the step of comparison between the two pages, the scanner 2 first builds a local dissimilarities map CDL made up of pixels CDL (x) having a position x, the value of each pixel CDL(x) is given by the formula:

$$\forall x \in \Re^\varepsilon, CDL(x) = (\overline{R(x)} \cdot V(x)) \cdot d(x, R)$$

where x represents the position of the pixel on a page;

V(x) is the value of the back page pixel at the position x;

$\overline{R(x)}$ is the inverse of the value of the front page pixel at the position x;

$(\overline{R(x)} \cdot V(x))$ is equivalent to a logical AND operator; and d(x,R) is the minimum distance between the position x and the front page pixels having an active value.

Using this relation, the scanner 2 creates a map the same size as the front page and the back page, and made up of all the CDL(x). Each value CDL(x) of the map is representative of the distance between information of the back page and of the front page. Thus the map shows whether or not the majority of active pixels of the back page is at a short distance from the active pixels on the front page.

It will be understood that assuming for example that a pixel in the inactive state has a value equal to zero, the construction formula of each CDL allows every pixel of the CDL having a position x where the back is inactive (nothing is detected by the scanner at this location, it is therefore unnecessary perform calculations of the distance d(x,R)) to be set to zero.

Likewise, the pixels of the CDL will be zero at places where the front is active (value equal to 1 for example, therefore its inverse is zero). The only cases in which the pixels of the CDL are not zero are the pixels where the front is active and the back not. In this case the result is active ($\overline{R(x)} \cdot V(x)$) is then for example 1), which allows activation of the last part of the formula, to with d(x,R).

However, d(x,R), is the minimum distance between a pixel at a given position x and the active pixels of the front page.

It is observed that in order to make the calculations faster, a logical operation makes it possible to exclude the cases where, at the same position x, the pixel of the front page and the pixel of the back page are active (distance equal to zero). Given that the measurement of distance d(x,R) is the most computation-hungry part, this strategy makes it possible to make significant gains in the cost of calculation.

In summary, the CDL is calculated by measuring, for each active pixel of the back page, the minimum distance (nonzero, explained in the foregoing paragraph) with the active pixels of the front page.

FIGS. 3 and 4 illustrate the construction of the CDL.

Figure 3A:
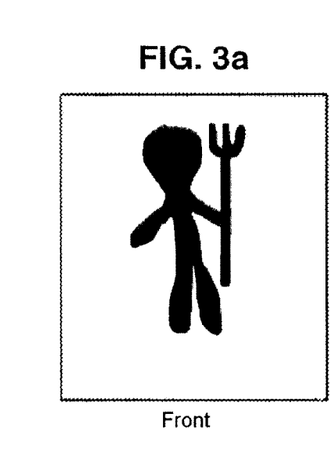
FIGS. 3 and 4 illustrate the construction of the local dissimilarity maps CDL from the front and back of a sheet.
Figure 3B:
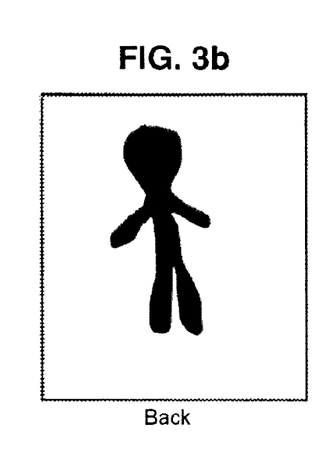
Figure 3C:
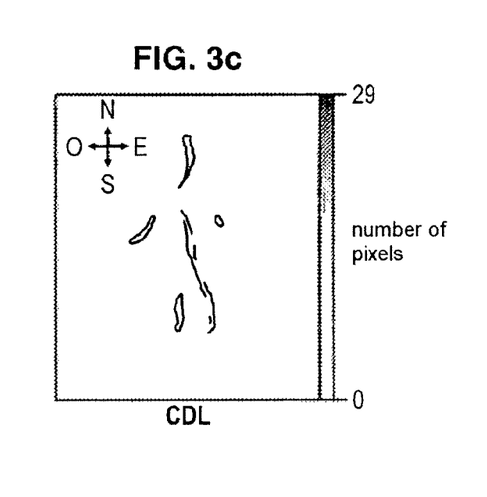

FIGS. 3a (front) and 3b (back) show that each of the two pages contains the drawing of a stick figure.

In FIG. 3b, that is on the back page, the stick figure is offset with respect to the front page of FIG. 3a and does not include a trident. We can see, thanks to the CDL constructed in FIG. 3c, that the offset is in the southeast direction. The value of the pixels of the CDL makes it possible to know the magnitude of the offset (in pixels). As will be seen in more detail in the following, the back page 3b of this sheet must therefore be detected as a blank page, given that the information is also found on the front page (due to the small distances retranscribed on the CDL, less than 29 pixels).

Figure 4A:
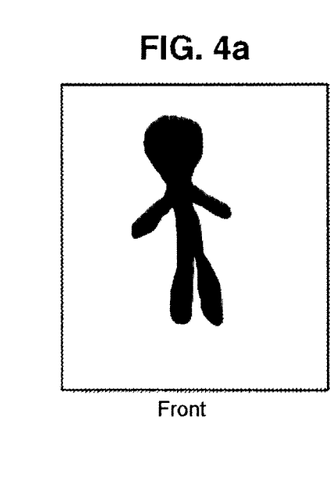
Figure 4B:
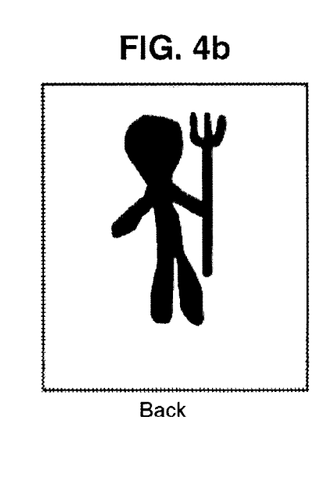
Figure 4C:
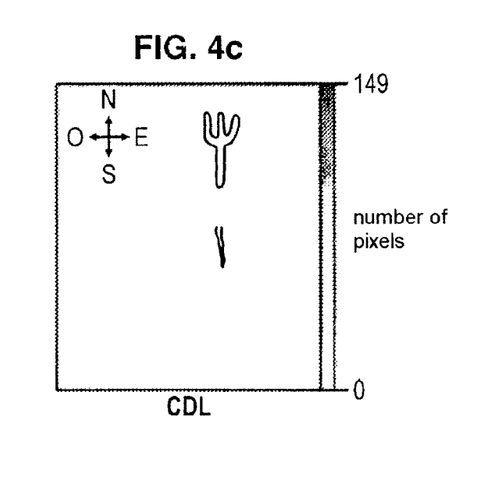

In the contrary case of FIG. 4 where the drawing on the front page (FIG. 4a) and the back page (FIG. 4b) is inverted with respect to FIGS. 3a and 3b, we can see that the offset is in the northwest direction and especially that part of the information of the back page does not appear on the front page (the trident). The trident is detectable thanks to the large distances transcribed on the CDL in FIG. 4c and ranging up to 149 pixels (compared to the 29 pixels in FIG. 3c). The result of the interpretation of the CDL of FIG. 4c is that the front page and the obverse page are different and are both information-bearing.

Of course, the result of the implementation of the method for FIG. 4 is the same as for FIG. 3, because the result must be independent of the direction of reading of the sheet. It is in fact for this reason that the step S8 is advantageously implemented. In the example of FIGS. 3 and 4, during step S8, the scanner 2 selects as the front page the image with the trident (FIG. 3a).

Given here is an example of the distance calculation technique d(x,R).

An advantageous technique for the calculation of d(x,R) is for example the calculation of the Manhattan distance (also known under the name of "city block" by those skilled in the art).

Figure 6:
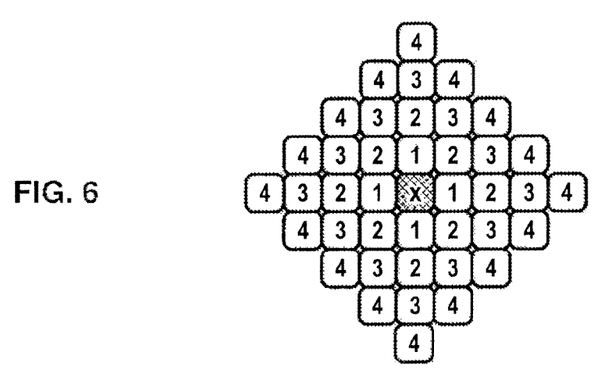
FIG. 6 shows schematically an example of calculation of the distance $d(x,R)$.

FIG. 6 shows schematically the principle of calculation of the distance d(x,R) from the Manhattan distance, with the values of distance with respect to the position x (distances from 1 to 4). The calculation consists of measuring the number of pixels to travel to move from one pixel to the other. In our case, this technique facilitates implementation of the method by the scanner.

It is enough, for calculating the distance d(x,R) to examine in succession all the pixels at a distance n from the pixel of origin. As soon as a front page pixel is found that is active, the examination is stopped; otherwise, it is continued at n+1.

At the end, the distance collected is n and it is stored in the CDL at the location of the pixel of origin.

As shown by FIG. 5, the scanner 2 then constructs a histogram collecting all the pixels CDL(x) having the same value, for each value of CDL(x).

As has already been stated, the CDL gives a visual representation of the areas of dissimilarity of the back page as compared with the front page. The purpose of the construction of the histogram is therefore to be able to quantify this dissimilarity and to make a decision concerning the blankness of the back page.

Figure 5A:
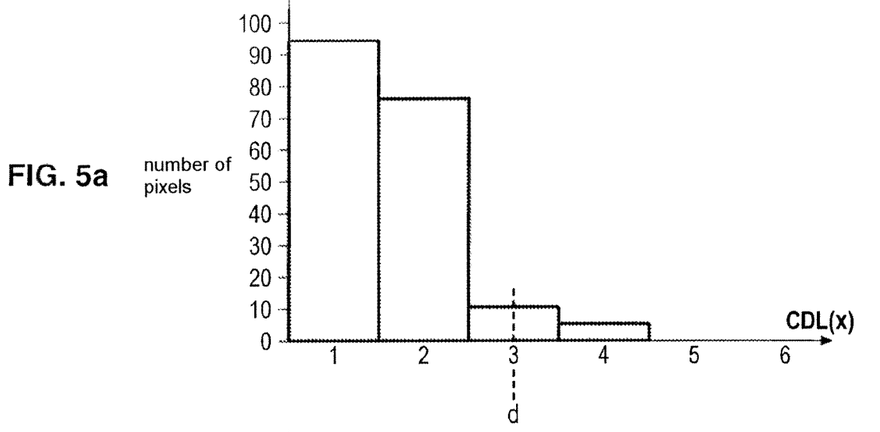
FIG. 5 shows examples of histograms reporting the number of pixels of local dissimilarity maps CDL having the same value.
Figure 5B:
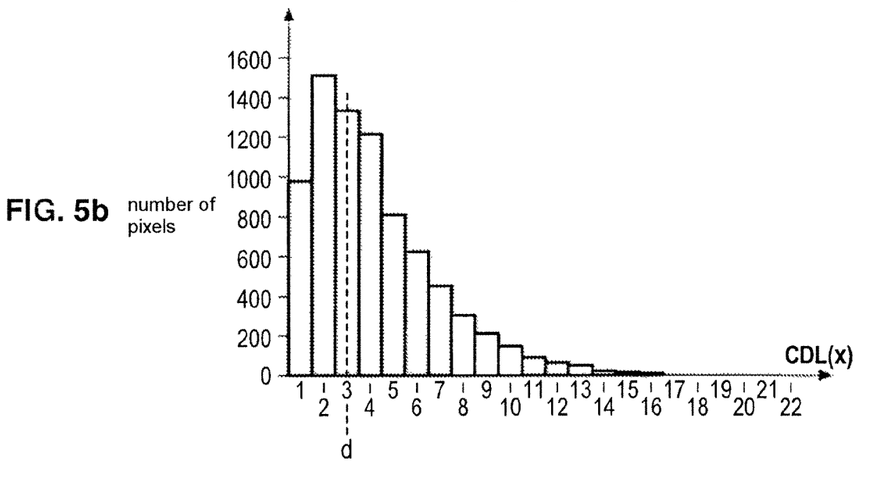

It is seen in FIG. 5 that a histogram constructed based on the comparison of two similar pages (FIG. 5a) is different from a histogram constructed based on comparison of two dissimilar pages (FIG. 5b). It is clearly observable that in the case of a sheet having a blank page, the values of the CDL(x) are closer to zero.

The scanner 2 considers that the front page R and back V pages are similar when the number of pixels of the local dissimilarities map CDL, the value whereof is less than a predetermined distance value d, is greater than a proportion H, and thus classifies the corresponding back page V as a blank page during the step S10.

The local dissimilarities map CDL can therefore be considered to be the datum characteristic of similarity between the two pages, and the proportion H can therefore be considered to be the similarity criterion.

The predetermined distance value d corresponds to a reference distance d(x,R) of three pixels for example (we then have d=3 if the active value is equal to 1), the proportion H being for example 70% of the pixels of the local dissimilarities map. With these values, a satisfactory result is obtained. In the case of FIG. 5a, we have 96% of the pixels of the CDL which are at a distance of less than 3 pixels, and in the case of FIG. 5b, only 47% are in this situation (the back page is dissimilar to the front page).

If more than 70% of the active pixels are within less than three pixels of the active pixels of the front page, the back page is considered to be blank and the information that it contains is interpreted as bleed-through (by porosity or transparency) from the front page.

The fact of taking into account only distances less than the reference distance d of three pixels for example make it superfluous to know the value of the distances greater than three pixels. Thus, during calculation of the distances for calculation of the CDL, when the distance d(x,R) exceeds the reference distance and reaches the value 4 (in our example), the scanner 2 stops the calculation of the distance and the pixel of the CDL concerned is automatically assigned a value d+1 (or 4 since a value of 1 is assigned as an active pixel value), and not the real value calculated by the general CDL formula. This adaptation makes it possible to increase considerably the implementation speed of the method and [reduce] the memory requirement for the CDL (the pixels can be coded over 2 bits).

The invention claimed is:

1. A method for detecting blank pages in the sheets of a document scanned on a machine including a scanner, wherein the scanner
    scans two pages of at least one sheet of a document to be scanned;
    performs at least one blank page detection on each scanned sheet;
    selects each sheet which does not have at least one page which was detected as blank in this blank page detection;
    compares the content of the two pages of each selected sheet, said comparison comprising comparing at least a characteristic vector which models the content of each page of each selected sheet, and classifies a page as blank when this comparison is above a similarity threshold.

2. A method according to claim 1, wherein the scanner scans the pages to transform each page into a set of pixels belonging to $\mathfrak{R}^{\acute{e}}$ the space of real numbers, and transposes each pixel so that it has a gray level, and also performs, prior to the selection of each sheet not having at least one page detected as blank, a binarisation of the pixels of the pages of each sheet, the binarisation consisting of assigning an active value to each pixel the gray level whereof exceeds a threshold t, and an inactive value to a pixel the gray level whereof is below the threshold t, where t is defined dynamically according to the neighborhood of the pixel.

3. A method according to claim 2, wherein, the scanner assigns subsequent to the binarisation, the front page R of a sheet to the page having the greater probability of being information-bearing, the scanner assigning the back page V to the other page of the sheet and wherein, to perform the step of comparison between the two pages, the scanner constructs first of all a local dissimilarities map CDL, made up of pixels CDL(x) having a position x, the value of each pixel CDL(x) being given by the formula:

$$\forall x \in \mathfrak{R}^{\acute{e}}, CDL(x) = (\overline{R(x)} \cdot V(x)) \cdot d(x,R)$$

where x represents the position of the pixel on a page;

V(x) is the value of the pixel of the back page at the position x;

$\overline{R(x)}$ is the inverse of the value of the front page pixel at the position x;

$(\overline{R(x)} \cdot V(x))$, is equivalent to a logical AND operator d(x,R) is the minimum distance calculated between the position x and the pixels of the front page having an active value:

the scanner then constructs a histogram collecting all the pixels CDL(x) having the same value, for each value of CDL(x), and the scanner considers that the front R and back V pages are similar when the number of pixels of the local dissimilarities map CDL, the value whereof is less than a predetermined distance value d, is greater than a proportion H, and thus classifies the corresponding back page V as a blank page.

4. A method according to claim 3, wherein the scanner calculates d(x,R) using the so-called Manhattan distance.

5. A method according to claim 3, wherein the predetermined distance value d corresponds to a reference distance d(x,R) of three pixels, the proportion 11 being 70% of the pixels of the local dissimilarities map.

6. A method according to claim 3, wherein, during the calculation of the distance d(x,R), the scanner directly assigns the value (d+1) to the pixel CDL(x) whenever the distance d(x,R) strictly exceeds the reference distance at the point x, and stops the corresponding distance calculation.

7. A method according to claim 3, wherein the step consisting of at least one blank page detection on each scanned sheet comprises, subsequent to the binarisation, as step whereby the scanner performs a second blank page or information-bearing page detection on each binarised page, the step of assigning a front page and an back page being then carried out on each sheet not having at least one page detected as blank during the second detection.

8. A method according to claim 1, wherein the step of at least one blank page detection on each scanned sheet comprises steps whereby the scanner performs a first blank page or information-bearing page detection on each scanned page, in gray levels; and selects each sheet every page whereof has not been detected as blank or information-bearing during the first detection.

9. A method according to claim 1, wherein the scanner performs a step of edge suppression and/or size readjustment and/or transposition into gray levels on the scanned pages.

10. A machine, comprising a scanner implementing a method according to claim 1.

* * * * *

UNITED STATES PATENT AND TRADEMARK OFFICE
CERTIFICATE OF CORRECTION

PATENT NO. : 8,724,182 B2
APPLICATION NO. : 13/395101
DATED : May 13, 2014
INVENTOR(S) : Olivier Labois, Pierre Sabatier and Jerome Berger It is certified that error appears in the above-identified patent and that said Letters Patent is hereby corrected as shown below:

In the Claims

Column 9, Claim 3, line 21, please delete "hack" and insert --back--.

Column 10, Claim 5, line 11, please delete "proportion 11" and insert --proportion H--.

Column 10, Claim 7, line 24, please delete "and an back" and insert --and a back--.

Signed and Sealed this
Second Day of September, 2014

Michelle K. Lee
*Deputy Director of the United States Patent and Trademark Office*